United States Patent
Kulkarni et al.

(10) Patent No.: US 10,316,759 B2
(45) Date of Patent: Jun. 11, 2019

(54) POWER GENERATION SYSTEM EXHAUST COOLING

(71) Applicant: General Electric Company, Schenectady, NY (US)

(72) Inventors: Parag Prakash Kulkarni, Niskayuna, NY (US); Lewis Berkley Davis, Jr., Niskayuna, NY (US); Sanji Ekanayake, Mableton, GA (US); Alston Ilford Scipio, Mableton, GA (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 15/168,695

(22) Filed: May 31, 2016

(65) Prior Publication Data

US 2017/0342911 A1 Nov. 30, 2017

(51) Int. Cl.
*F01N 3/05* (2006.01)
*F01N 3/20* (2006.01)
(Continued)

(52) U.S. Cl.
CPC .................. *F02C 9/20* (2013.01); *F01N 3/05* (2013.01); *F01N 3/2066* (2013.01); *F01N 3/22* (2013.01);
(Continued)

(58) Field of Classification Search
CPC . F01N 3/22; F01N 3/30; F01N 3/2066; F01N 3/05; F01N 3/0842; F01N 2610/02;
(Continued)

(56) References Cited

U.S. PATENT DOCUMENTS 2,627,927 A 2/1953 Mergen
3,677,012 A 7/1972 Batscha
(Continued)

FOREIGN PATENT DOCUMENTS

GB 774425 A 5/1957
JP 2013124555 A 6/2013

OTHER PUBLICATIONS

U.S. Appl. No. 14/753,088, Office Action 1 dated Jun. 28, 2017, 37 pages.
(Continued)

*Primary Examiner* — Steven M Sutherland
*Assistant Examiner* — Thuyhang N Nguyen
(74) *Attorney, Agent, or Firm* — Dale Davis; Hoffman Warnick LLC

(57) ABSTRACT

An airflow control system control system for a gas turbine system according to an embodiment includes: an airflow generation system including a plurality of air moving systems for selective attachment to a rotatable shaft of a gas turbine system, the airflow generation system drawing in an excess flow of air through an air intake section; and a mixing area for receiving an exhaust gas stream of the gas turbine system; the airflow generation system: directing a first portion and a second portion of the excess flow of air generated by the airflow generation system into the mixing area to reduce a temperature of the exhaust gas stream; and directing a third portion of the excess flow of air generated by the airflow generation system into a discharge chamber of a compressor component of the gas turbine system.

16 Claims, 5 Drawing Sheets

(51) Int. Cl.

| | | |
|---|---|---|
| *F01N 3/22* | (2006.01) | |
| *F01N 3/30* | (2006.01) | |
| *F02C 3/34* | (2006.01) | |
| *F02C 7/14* | (2006.01) | |
| *F02C 7/18* | (2006.01) | |
| *F02C 9/20* | (2006.01) | |
| *F02C 7/057* | (2006.01) | |

(52) U.S. Cl.
CPC ............... *F01N 3/30* (2013.01); *F02C 3/34* (2013.01); *F02C 7/057* (2013.01); *F02C 7/14* (2013.01); *F02C 7/18* (2013.01); *F01N 2590/10* (2013.01); *F01N 2610/02* (2013.01); *F01N 2900/1404* (2013.01); *F05D 2260/20* (2013.01); *F05D 2270/082* (2013.01); *Y02T 10/24* (2013.01)

(58) Field of Classification Search
CPC ........ F05D 2270/082; F02C 9/18; F02C 9/16; F02C 7/04
See application file for complete search history.

(56) References Cited

U.S. PATENT DOCUMENTS

| | | | |
|---|---|---|---|
| 3,922,850 A | 12/1975 | McCabe | |
| 3,968,647 A | 7/1976 | Boudigues | |
| 4,064,692 A | 12/1977 | Johnson et al. | |
| 4,068,471 A | 1/1978 | Simmons | |
| 4,069,661 A | 1/1978 | Rundell et al. | |
| 4,085,583 A | 4/1978 | Klees | |
| 4,131,432 A | 12/1978 | Sato et al. | |
| 4,165,609 A | 8/1979 | Rudolph | |
| 4,175,384 A | 11/1979 | Wagenknecht et al. | |
| 4,183,210 A | 1/1980 | Snell | |
| 4,222,233 A | 9/1980 | Johnson et al. | |
| 4,292,008 A | 9/1981 | Grosjean et al. | |
| 4,292,802 A | 10/1981 | Snow | |
| 4,555,902 A | 12/1985 | Pilarczyk | |
| 4,813,229 A | 3/1989 | Simmons | |
| 4,892,269 A | 1/1990 | Greco et al. | |
| 4,907,406 A | 3/1990 | Kirikami et al. | |
| 4,961,312 A | 10/1990 | Simmons | |
| 4,982,564 A | 1/1991 | Hines | |
| 5,014,508 A | 5/1991 | Lifka | |
| 5,113,649 A | 5/1992 | Siedlecki, Jr. | |
| 5,255,505 A | 10/1993 | Cloyd et al. | |
| 5,279,109 A | 1/1994 | Liu et al. | |
| 5,473,898 A | 12/1995 | Briesch | |
| 5,632,142 A | 5/1997 | Surette | |
| 5,809,772 A | 9/1998 | Giffin, III et al. | |
| 6,250,061 B1 | 6/2001 | Orlando | |
| 6,543,234 B2 | 4/2003 | Anand et al. | |
| 6,612,114 B1 | 9/2003 | Klingels | |
| 6,786,034 B2 | 9/2004 | Liebig et al. | |
| 6,798,079 B2 | 9/2004 | Nelson et al. | |
| 7,730,714 B2 | 6/2010 | Wood et al. | |
| 7,966,825 B2 | 6/2011 | Judd | |
| 8,015,826 B2* | 9/2011 | Myers | F01K 13/02 60/782 |
| 8,186,152 B2 | 5/2012 | Zhang et al. | |
| 8,261,528 B2 | 9/2012 | Chillar et al. | |
| 8,365,510 B2 | 2/2013 | Lugg | |
| 8,549,833 B2 | 10/2013 | Hyde et al. | |
| 2002/0124568 A1 | 9/2002 | Mikkelsen et al. | |
| 2002/0129608 A1 | 9/2002 | Anand et al. | |
| 2003/0182944 A1* | 10/2003 | Hoffman | F01K 23/10 60/772 |
| 2005/0235649 A1 | 10/2005 | Baer et al. | |
| 2007/0101696 A1 | 5/2007 | Dooley | |
| 2007/0130952 A1 | 6/2007 | Copen | |
| 2007/0271929 A1 | 11/2007 | Berry | |
| 2008/0116054 A1 | 5/2008 | Leach et al. | |
| 2008/0253881 A1 | 10/2008 | Richards | |
| 2010/0005806 A1 | 1/2010 | Donnelly | |
| 2010/0024379 A1 | 2/2010 | Sengar et al. | |
| 2010/0064655 A1 | 3/2010 | Zhang et al. | |
| 2010/0107600 A1 | 5/2010 | Hillel et al. | |
| 2010/0126182 A1 | 5/2010 | Hoover et al. | |
| 2010/0215558 A1 | 8/2010 | Kraemer | |
| 2010/0247297 A1 | 9/2010 | Legare et al. | |
| 2011/0030331 A1 | 2/2011 | Tong et al. | |
| 2011/0036066 A1 | 2/2011 | Zhang et al. | |
| 2011/0067385 A1 | 3/2011 | Hirata et al. | |
| 2011/0138771 A1* | 6/2011 | Feller | F01K 23/10 60/39.182 |
| 2012/0171020 A1 | 7/2012 | Peck et al. | |
| 2013/0005237 A1 | 1/2013 | Baten et al. | |
| 2013/0025254 A1 | 1/2013 | Kurosaka et al. | |
| 2013/0031894 A1 | 2/2013 | Hodgson et al. | |
| 2013/0031910 A1 | 2/2013 | Merchant et al. | |
| 2013/0125557 A1 | 5/2013 | Scipio et al. | |
| 2013/0318965 A1 | 12/2013 | Ekanayake et al. | |
| 2013/0318984 A1 | 12/2013 | Ekanayake et al. | |
| 2013/0318987 A1 | 12/2013 | Ekanayake et al. | |
| 2013/0318997 A1* | 12/2013 | Conchieri | F02C 6/12 60/783 |
| 2014/0090354 A1 | 4/2014 | Scipio et al. | |
| 2014/0150447 A1 | 6/2014 | Ekanayake et al. | |
| 2014/0165583 A1 | 6/2014 | Oliverio | |
| 2014/0208765 A1 | 7/2014 | Ekanayake et al. | |
| 2014/0230433 A1 | 8/2014 | Yacoub | |
| 2014/0230444 A1 | 8/2014 | Hao et al. | |
| 2014/0234073 A1 | 8/2014 | Moreton et al. | |
| 2014/0366547 A1* | 12/2014 | Kraft | F02C 7/224 60/772 |
| 2015/0047359 A1 | 2/2015 | Maguire et al. | |
| 2015/0089955 A1 | 4/2015 | Knapp et al. | |
| 2015/0121842 A1 | 5/2015 | Moes | |
| 2015/0143811 A1 | 5/2015 | Pang et al. | |
| 2015/0252683 A1 | 9/2015 | Hasting et al. | |
| 2016/0169119 A1 | 6/2016 | Musci et al. | |
| 2016/0201605 A1 | 7/2016 | Brandstein et al. | |
| 2016/0230658 A1 | 8/2016 | Hanlon et al. | |
| 2016/0326878 A1 | 11/2016 | Morimoto et al. | |
| 2016/0348560 A1 | 12/2016 | Sato et al. | |
| 2016/0376908 A1 | 12/2016 | Reed et al. | |
| 2016/0376909 A1 | 12/2016 | Kulkarni et al. | |
| 2016/0376954 A1 | 12/2016 | Davis, Jr. et al. | |
| 2016/0376955 A1 | 12/2016 | Reed et al. | |
| 2016/0376956 A1 | 12/2016 | Kulkarni et al. | |
| 2016/0376957 A1 | 12/2016 | Kulkarni et al. | |
| 2016/0376958 A1 | 12/2016 | Davis, Jr. et al. | |
| 2016/0376959 A1 | 12/2016 | Davis, Jr. et al. | |
| 2016/0376960 A1 | 12/2016 | Reed et al. | |
| 2016/0376961 A1 | 12/2016 | Kulkarni et al. | |
| 2016/0376967 A1 | 12/2016 | Kulkarni et al. | |
| 2016/0376991 A1 | 12/2016 | Davis, Jr. et al. | |
| 2016/0376992 A1 | 12/2016 | Davis, Jr. et al. | |
| 2016/0376994 A1 | 12/2016 | Kulkarni et al. | |

OTHER PUBLICATIONS

U.S. Appl. No. 14/753,066, Notice of Allowance dated Jul. 13, 2017, 27 pages.
U.S. Appl. No. 14/753,072, Notice of Allowance dated Jul. 13, 2017, 28 pages.
U.S. Appl. No. 14/753,077, Final Office Action dated Jan. 12, 2018, 26 pages.
U.S. Appl. No. 14/753,097, Final Office Action dated Jan. 29, 2018, 27 pages.
U.S. Appl. No. 14/753,102, Notice of Allowance dated Feb. 16, 2018, 21 pages.
U.S. Appl. No. 14/753,097, Notice of Allowance dated Feb. 22, 2018, 10 pages.
U.S. Appl. No. 14/753,107, Notice of Allowance dated Feb. 22, 2018, 21 pages.
U.S. Appl. No. 14/753,102, Office Action 1 dated Oct. 26, 2017, 53 pages.
U.S. Appl. No. 14/753,093, Final Office Action 1 dated Nov. 1, 2017, 30 pages.

(56) References Cited

OTHER PUBLICATIONS

U.S. Appl. No. 14/753,080, Notice of Allowance dated Nov. 3, 2017, 48 pages.
U.S. Appl. No. 14/753,074, Notice of Allowance dated Sep. 18, 2017, 31 pages.
U.S. Appl. No. 14/753,064, Notice of Allowance dated Sep. 21, 2017, 10 pages.
U.S. Appl. No. 14/753,073, Office Action 2 dated Nov. 16, 2017, 35 pages.
U.S. Appl. No. 14/753,105, Office Action 1 dated Dec. 11, 2017, 67 pages.
U.S. Appl. No. 14/753,105, Notice of Allowance dated Jun. 25, 2018, 12 pages.
U.S. Appl. No. 14/753,074, Office Action 1 dated Mar. 10, 2017, 41 pages.
U.S. Appl. No. 14/753,097, Office Action 1 dated Oct. 11, 2017, 53 pages.
U.S. Appl. No. 14/753,077, Office Action 1 dated Oct. 13, 2017, 54 pages.
U.S. Appl. No. 14/753,107, Office Action 1 dated Oct. 20, 2017, 52 pages.
U.S. Appl. No. 14/753,085, Notice of Allowance dated Oct. 19, 2017, 47 pages.
U.S. Appl. No. 14/753,088, Final Office Action 1 dated Oct. 19, 2017, 32 pages.
U.S. Appl. No. 14/753,093, Office Action 1 dated Jun. 1, 2017, 40 pages.
U.S. Appl. No. 14/753,064, Final Office Action 1 dated Jun. 2, 2017, 31 pages.
U.S. Appl. No. 14/753,073, Final Office Action 1 dated Jun. 20, 2017, 28 pages.
U.S. Appl. No. 14/753,105, Final Office Action dated Apr. 6, 2018, 28 pages.
U.S. Appl. No. 14/753,093, Office Action dated Apr. 18, 2018, 38 pages.
U.S. Appl. No. 14/753,077, Notice of Allowance dated May 7, 2018, 14 pages.
U.S. Appl. No. 14/753,073, Final Office Action dated May 22, 2018, 21 pages.
U.S. Appl. No. 14/753,073, Office Action 1 dated Dec. 13, 2016, 16 pages.
U.S. Appl. No. 14/753,064, Office Action 1 dated Jan. 19, 2017, 24 pages.
U.S. Appl. No. 14/753,066, Office Action 1 dated Feb. 24, 2017, 33 pages.
U.S. Appl. No. 14/753,072, Office Action 1 dated Feb. 24, 2017, 34 pages.
Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 Pages.
Reale, Michael J.; "New High Efficiency Simple Cycle Gas Turbine"; General Electric Company; 2004; 20 Pages. http://site.ge-energy.com/prod_serv/products/tech_docs/en/downloads/ger4222a.pdf.
U.S. Appl. No. 14/753,093, Final Office Action dated Nov. 28, 2018, 33 pages.
U.S. Appl. No. 14/753,073, Notice of Allowance dated Nov. 29, 2018, 17 pages.

\* cited by examiner

POWER GENERATION SYSTEM EXHAUST COOLING

CROSS-REFERENCE TO RELATED APPLICATIONS

This application is related to co-pending U.S. application Ser. Nos. 14/753,064, 14/753,072, 14/753,073, 14/753,074, 14/753,077, 14/753,080, 14/753,085, 14/753,088, 14/753,093, 14/753,102, 14/753,107, 14/753,097, 14/753,105, all filed on Jun. 29, 2015.

BACKGROUND OF THE INVENTION

The disclosure relates generally to power generation systems, and more particularly, to systems for cooling the exhaust gas of power generation systems.

Exhaust gas from power generation systems, for example a simple cycle gas turbine power generation system, often must meet stringent regulatory requirements for the composition of the exhaust gas released into the atmosphere. One of the components typically found in the exhaust gas of a gas turbine power generation system and subject to regulation is nitrogen oxide (i.e., $NO_x$), which includes, for example, nitric oxide and nitrogen dioxide. To remove the $NO_x$ from the exhaust gas stream, technology such as selective catalytic reduction (SCR) is often utilized. In an SCR process, ammonia ($NH_3$) or the like reacts with the $NO_x$ and produces nitrogen ($N_2$) and water ($H_2O$).

The effectiveness of the SCR process depends in part on the temperature of the exhaust gas that is processed. The temperature of the exhaust gas from a gas turbine power generation system is often higher than about 1100° F. However, SCR catalysts need to operate at less than about 900° F. to maintain effectiveness over a reasonable catalyst lifespan. To this extent, the exhaust gas from a simple cycle gas turbine power generation system is typically cooled prior to SCR.

Large external blower systems have been used to reduce the exhaust gas temperature of a gas turbine power generation system below 900° F. by mixing a cooling gas, such as ambient air, with the exhaust gas. Because of the possibility of catalyst damage due to a failure of an external blower system, a redundant external blower system is typically utilized. These external blower systems include many components, such as blowers, motors, filters, air intake structures, and large ducts, which are expensive, bulky, and add to the operating cost of a gas turbine power generation system. Additionally, the external blower systems and the operation of the gas turbine power generation system are not inherently coupled, thus increasing the probability of SCR catalyst damage due to excess temperature during various modes of gas turbine operation. To prevent SCR catalyst damage due to excess temperature (e.g., if the external blower system(s) fail or cannot sufficiently cool the exhaust gas), the gas turbine may need to be shut down until the temperature issue can be rectified.

Utility power producers use combined cycle (CC) power generation systems because of their inherent high efficiencies and installed cost advantage. CC power generation systems typically include a gas turbine, a heat recovery steam generator (HRSG), and a steam turbine. The heat recovery steam generator uses the hot exhaust gas from the gas turbine to create steam, which drives the steam turbine. The combination of a gas turbine and a steam turbine achieves greater efficiency than would be possible independently.

Operational flexibility to meet varying power grid demands at different times of the day is an important consideration in CC power generation systems. The issue becomes more important as intermittent energy sources such as solar and wind are integrated into the power grid. To this extent, CC power generation systems powered by fossil fuels must be capable of increasing/decreasing power output as required to accommodate such intermittent energy sources.

Non-steady state emissions from a CC power generation system (e.g., during start-up) are generally closely scrutinized by regulatory authorities. During start-up, emission control devices employing selective catalytic reduction (SCR) and carbon monoxide (CO) catalysts are not active. To avoid thermal stresses in the steam turbine, the gas turbine has to be held at a lower load to control the HRSG inlet temperature to around 700° F. Since emission are higher at lower gas turbine loads and the emission control devices are not yet active, emissions during start-up can be an order of magnitude higher than those at steady state operation. Further, operating gas turbines at lower loads for a considerable amount of time also reduces the power provided to the power grid during the crucial start-up period.

Large increases in the electrical power demand placed upon an electrical power distribution grid will tend to reduce the electrical operational frequency of the grid, causing an "under-frequency" grid event. For example, a heavy or sudden electrical demand may cause a particular power distribution grid having a nominal operational frequency of 50 Hz to momentarily operate at 49 Hz. In conventional electrical power generation systems that utilize one or more heavy-duty industrial gas turbines for supplying electrical power to the grid, the physical speed of each gas turbine supplying power to the grid is synchronized to the electrical frequency of the grid. To this extent, during an under-frequency grid event in which the frequency of the grid decreases, the physical speed of the gas turbines will also decrease. Unfortunately, as the physical speed of a gas turbine decreases with other factors being equal, its power output correspondingly decreases. Consequently, during an under-frequency grid event, a gas turbine will tend to output a lower power. In the past, a common practice in response to a power grid under-frequency grid event involved increasing the firing temperature of the gas turbine to produce more power in an effort to maintain a predetermined level of output power. Unfortunately, such over-firing of the gas turbine may reduce the operational life expectancy of various hot gas path components within the gas turbine.

BRIEF DESCRIPTION OF THE INVENTION

A first aspect of the disclosure provides an airflow control system for a gas turbine system, including: an airflow generation system including a plurality of air moving systems for selective attachment to a rotatable shaft of a gas turbine system, the airflow generation system drawing in an excess flow of air through an air intake section; and a mixing area for receiving an exhaust gas stream of the gas turbine system; the airflow generation system: directing a first portion of the excess flow of air generated by the airflow generation system into the mixing area to reduce a temperature of the exhaust gas stream; directing a second portion of the excess flow of air generated by the airflow generation system into the mixing area to reduce the temperature of the exhaust gas stream; and directing a third portion of the excess flow of air generated by the airflow generation system into a discharge chamber of a compressor component of the gas turbine system.

A second aspect of the disclosure provides a turbomachine system, including: a gas turbine system including a compressor component, a combustor component, and a turbine component; a shaft driven by the turbine component; an airflow generation system including a plurality of fans for selective attachment to the shaft of the gas turbine system, the airflow generation system drawing in an excess flow of air through an air intake section; and a mixing area for receiving an exhaust gas stream of the gas turbine system; the airflow generation system: directing a first portion of the excess flow of air generated by the airflow generation system into the mixing area to reduce a temperature of the exhaust gas stream; directing a second portion of the excess flow of air generated by the airflow generation system into the mixing area to reduce the temperature of the exhaust gas stream; and directing a third portion of the excess flow of air generated by the airflow generation system into a discharge chamber of a compressor component of the gas turbine system; and a system, selected from the group consisting of a selective catalytic reduction (SCR) system and a heat recovery steam generator, for processing the reduced temperature exhaust gas stream.

A third aspect of the disclosure provides a power generation system, having: a gas turbine system including a compressor component, a combustor component, and a turbine component; a shaft driven by the gas turbine system; an electrical generator coupled to the shaft for generating electricity; an airflow generation system including a plurality of fans for selective attachment to the shaft of the gas turbine system, the airflow generation system drawing in an excess flow of air through an air intake section; and a mixing area for receiving an exhaust gas stream of the gas turbine system; the airflow generation system: directing a first portion of the excess flow of air generated by the airflow generation system into the mixing area to reduce a temperature of the exhaust gas stream; directing a second portion of the excess flow of air generated by the airflow generation system into the mixing area to reduce the temperature of the exhaust gas stream; and directing a third portion of the excess flow of air generated by the airflow generation system into a discharge chamber of a compressor component of the gas turbine system; and a system, selected from the group consisting of a selective catalytic reduction (SCR) system and a heat recovery steam generator, for processing the reduced temperature exhaust gas stream.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

Figure 1:
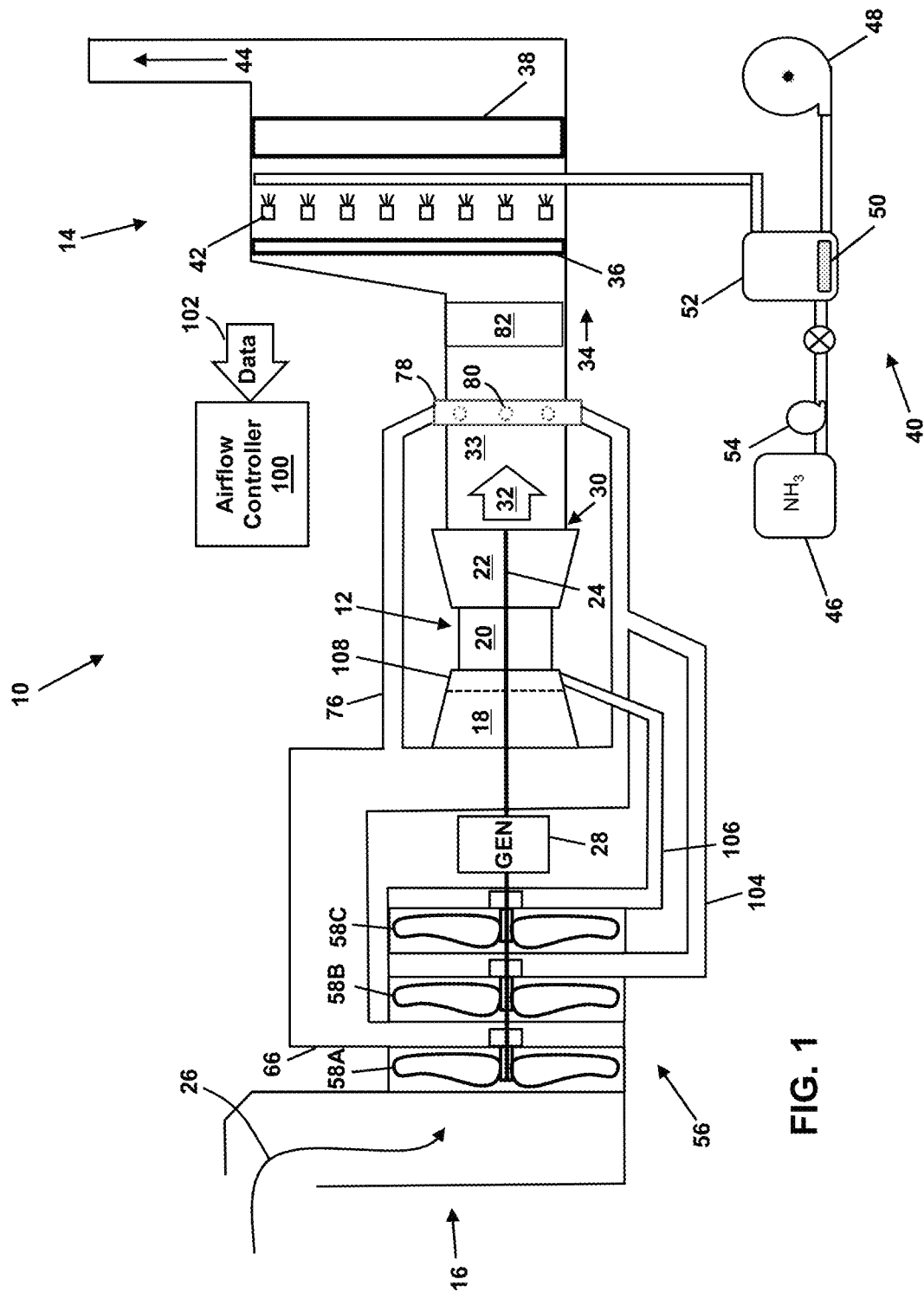
FIG. 1 shows a schematic diagram of a simple cycle gas turbine power generation system according to embodiments.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

FIG. 1 is a block diagram of a turbomachine system (e.g., a simple cycle gas turbine power generation system 10) that includes a gas turbine system 12 and an exhaust processing system 14. The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a turbine shaft 24. In operation, air (e.g., ambient air) enters the gas turbine system 12 via the air intake section 16 and is pressurized in the compressor component 18. The compressor component 18 includes at least one stage including a plurality of compressor blades coupled to the turbine shaft 24. Rotation of the turbine shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the turbine shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the turbine shaft 24 into rotation. In the turbine component 22, the energy of the combustion gases is converted into work, some of which is used to drive the compressor component 18 through the rotating turbine shaft 24, with the remainder available for useful work to drive a load such as, but not limited to, an electrical generator 28 for producing electricity, and/or another turbine.

The combustion gases that flow through the turbine component 22 exit the downstream end 30 of the turbine component 22 as a stream of exhaust gas 32. The exhaust gas stream 32 may continue to flow in a downstream direction 34 towards the exhaust processing system 14. The downstream end 30 of the turbine component 22 may be fluidly coupled via a mixing area 33 to a CO removal system (including, e.g., a CO catalyst 36) and an SCR system (including, e.g., an SCR catalyst 38) of the exhaust processing system 14. As discussed above, as a result of the combustion process, the exhaust gas stream 32 may include certain byproducts, such as nitrogen oxides ($NO_x$), sulfur oxides ($SO_x$), carbon oxides ($CO_x$), and unburned hydrocarbons. Due to certain regulatory requirements, an exhaust processing system 14 may be employed to reduce or substantially minimize the concentration of such byproducts prior to atmospheric release.

One technique for removing or reducing the amount of $NO_x$ in the exhaust gas stream 32 is by using a selective catalytic reduction (SCR) process. For example, in an SCR process for removing $NO_x$ from the exhaust gas stream 32, ammonia ($NH_3$) or other suitable reductant may be injected into the exhaust gas stream 32. The ammonia reacts with the $NO_x$ to produce nitrogen ($N_2$) and water ($H_2O$).

As shown in FIG. 1, an ammonia evaporator system 40 and an ammonia injection grid 42 may be used to vaporize and inject an ammonia solution (e.g., stored in a tank 46) into the exhaust gas stream 32 upstream of the SCR catalyst 38. The ammonia injection grid 42 may include, for example, a network of pipes with openings/nozzles for injecting vaporized ammonia into the exhaust gas stream 32. As will be appreciated, the ammonia and $NO_x$ in the exhaust gas stream 32 react as they pass through the SCR catalyst 38 to produce nitrogen ($N_2$) and water ($H_2O$), thus removing $NO_x$ from the exhaust gas stream 32. The resulting emissions may be released into the atmosphere through a stack 44 of the gas turbine system 12.

The ammonia evaporator system 40 may further include, for example, a blower system 48, one or more heaters 50 (e.g., electric heaters), and an ammonia vaporizer 52, for providing vaporized ammonia that is injected into the exhaust gas stream 32 via the ammonia injection grid 42. The ammonia may be pumped from the tank 46 to the ammonia vaporizer 52 using a pump system 54. The blower system 48 may include redundant blowers, while the pump system 54 may include redundant pumps to ensure continued operation of the ammonia evaporator system 40 in case of individual blower/pump failure.

The effectiveness of the SCR process depends in part on the temperature of the exhaust gas stream 32 that is processed. The temperature of the exhaust gas stream 32 generated by the gas turbine system 12 is often higher than about 1100° F. However, the SCR catalyst 38 typically needs to operate at temperatures less than about 900° F.

According to embodiments, an airflow generation system 56 including a plurality of air moving systems (e.g., fans) may be used to selectively provide a flow of air to the simple cycle gas turbine power generation system 10. For example, portions of the flow of air generated by the airflow generation system 56 having a first pressure level may be provided to the inlet of the compressor component 18. This flow of air may be used to supercharge the gas turbine 12 and to lower the temperature of the exhaust gas stream 32 (e.g., to a level suitable for the SCR catalyst 38). Another portion of the flow of air generated by the airflow generation system 56 having a second pressure level may also be used to lower the temperature of the exhaust gas stream 32. Yet another portion of the flow of air generated by the airflow generation system 56 having a third pressure level may be routed to the discharge chamber of the compressor component 18 to enhance the performance of the gas turbine 12. The first, second, and third pressure levels are generally different, but may be equivalent in embodiments.

Figure 2:
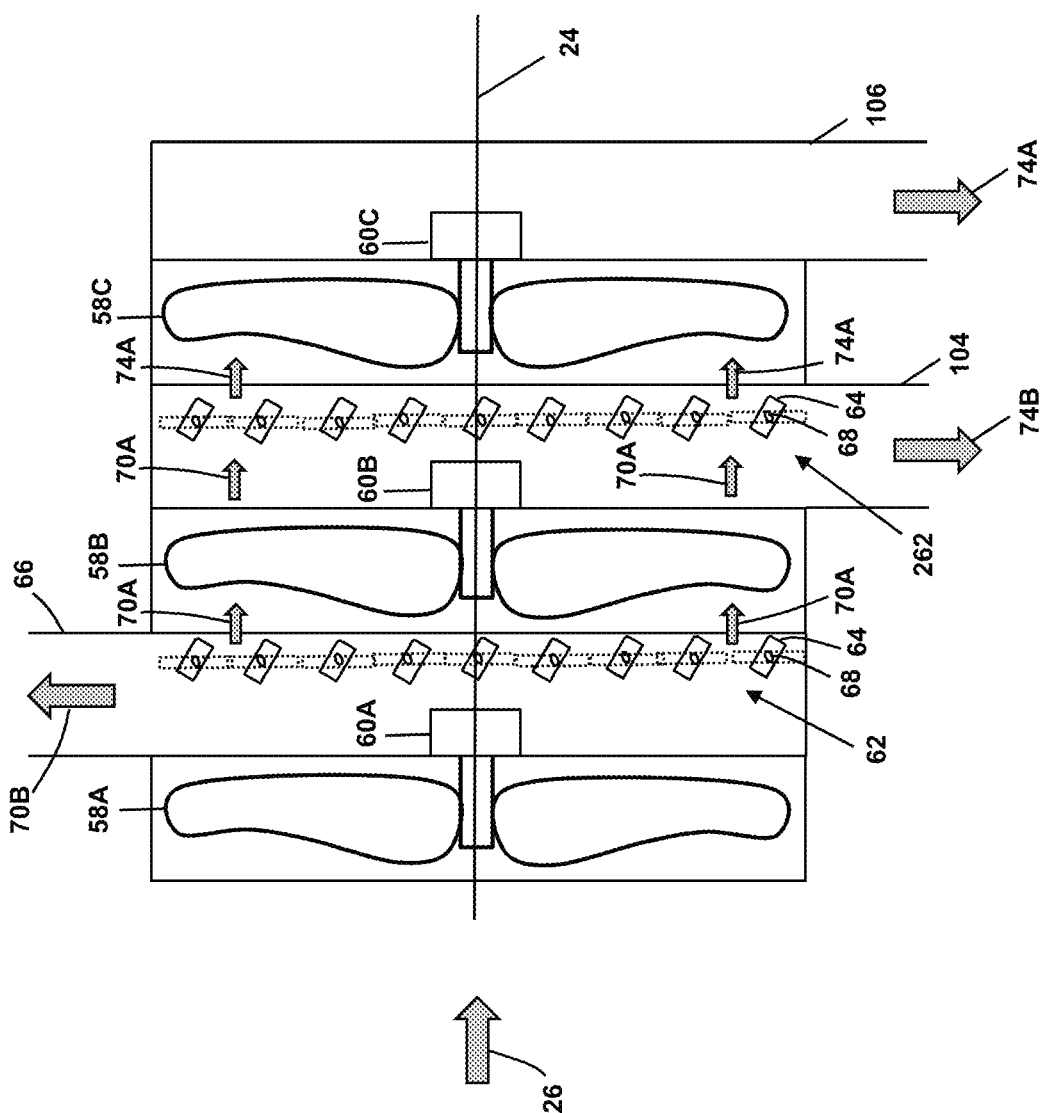
FIG. 2 depicts an airflow generation system according to embodiments.

The airflow generation system 56 is configured to draw in a flow of air 26 through the air intake section 16. According to embodiments, as depicted in FIGS. 1 and 2, the airflow generation system 56 may include a series arrangement of fans 58A, 58B, 58C. Each fan 58A, 58B, 58C may be attached to the turbine shaft 24 (or to a generator shaft coupled to, and driven by, the turbine shaft 24) upstream of the gas turbine system 12. In embodiments, each of the fans 58A, 58B, 58C is independently attached to the turbine shaft 24 by a coupler 60A, 60B, 60C, respectively. The couplers 60A, 60B, 60C may include, for example, torque converters, clutches, and/or other similar coupling mechanisms capable of adjustably controlling the rotational velocity of the respective fans 58A, 58B, 58C. Use of the couplers 60A, 60B, 60C allows the rotational velocity of each of the fans 58A, 58B, 58C to be individually controlled. Although three fans 58A, 58B, 58C are shown, the airflow generation system 56 may include two or more fans that are independently attached to the turbine shaft 24 by respective couplers. In addition, one or more fans that are fixed to the turbine shaft 24 may be utilized.

The compressor component 18 has a flow rate capacity and is configured to draw in a flow of air (e.g., ambient air) based on its flow rate capacity. In operation, the airflow generation system 56 is designed to draw in a flow of air 26 through the air intake section 16 that is about 10% to about 40% of the flow rate capacity of the compressor component 18. In general, the percentage increase in the flow of air may be varied and selectively controlled based on several factors including the load on the gas turbine system 12, the temperature of the air being drawn into the gas turbine system 12, the temperature of the exhaust gas stream 32 at the SCR catalyst 38, etc.

As depicted in FIG. 2, a guide vane assembly 62 (or other suitable air dividing/diversion system), which includes a plurality of inlet guide vanes 64, may be used to divide the flow of air 26 drawn in by the fan airflow generation system 56 into a flow of air 70A and a flow of air 70B, based for example, on the positioning of the plurality of inlet guide vanes 64. The flow of air 70A is directed by the guide vane assembly 62 toward the fan 58B. The flow of air 70B, which has a first pressure level, is directed by the guide vane assembly 62 into a duct 66. Each inlet guide vane 64 may be selectively controlled (e.g., rotated) by an independent actuator 68. Actuators 68 according to various embodiments are shown schematically in FIG. 2, but any known actuator may be utilized. For example, the actuators 68 may comprise an electro-mechanical motor, or any other type of suitable actuator.

The actuators 68 may be independently and/or collectively controlled in response to commands from an airflow controller 100 to selectively vary the positioning of the inlet guide vanes 64. That is, the inlet guide vanes 64 may be selectively rotated about a pivot axis by the actuators 68. In embodiments, each inlet guide vane 64 may be individually pivoted independently of any other inlet guide vane 64. In other embodiments, groups of inlet guide vanes 64 may be pivoted independently of other groups of inlet guide vanes 64 (i.e., pivoted in groups of two or more such that every inlet guide vane 64 in a group rotates together the same amount). Data 102 (e.g., position data as sensed by electro-mechanical sensors or the like) for each of the inlet guide vanes 64 may be provided to the airflow controller 100.

The flow of air 70B passes through the duct 66 toward the compressor component 18. At least a portion of the flow of air 70B may be used to increase the air pressure at the compressor component 18. For example, in the case where the flow of air 70B is increased from about 10% to about 40% by the operation of the airflow generation system 56, a corresponding pressure increase of about 5 to about 20 inches of water may be achieved at the compressor component 18. This pressure increase may be used to overcome pressure drop and facilitate proper mixing (described below) of cooler air with the exhaust gas stream 32 in the downstream exhaust processing system 14. The pressure increase may also be used to supercharge the gas turbine system 12.

Figure 3:
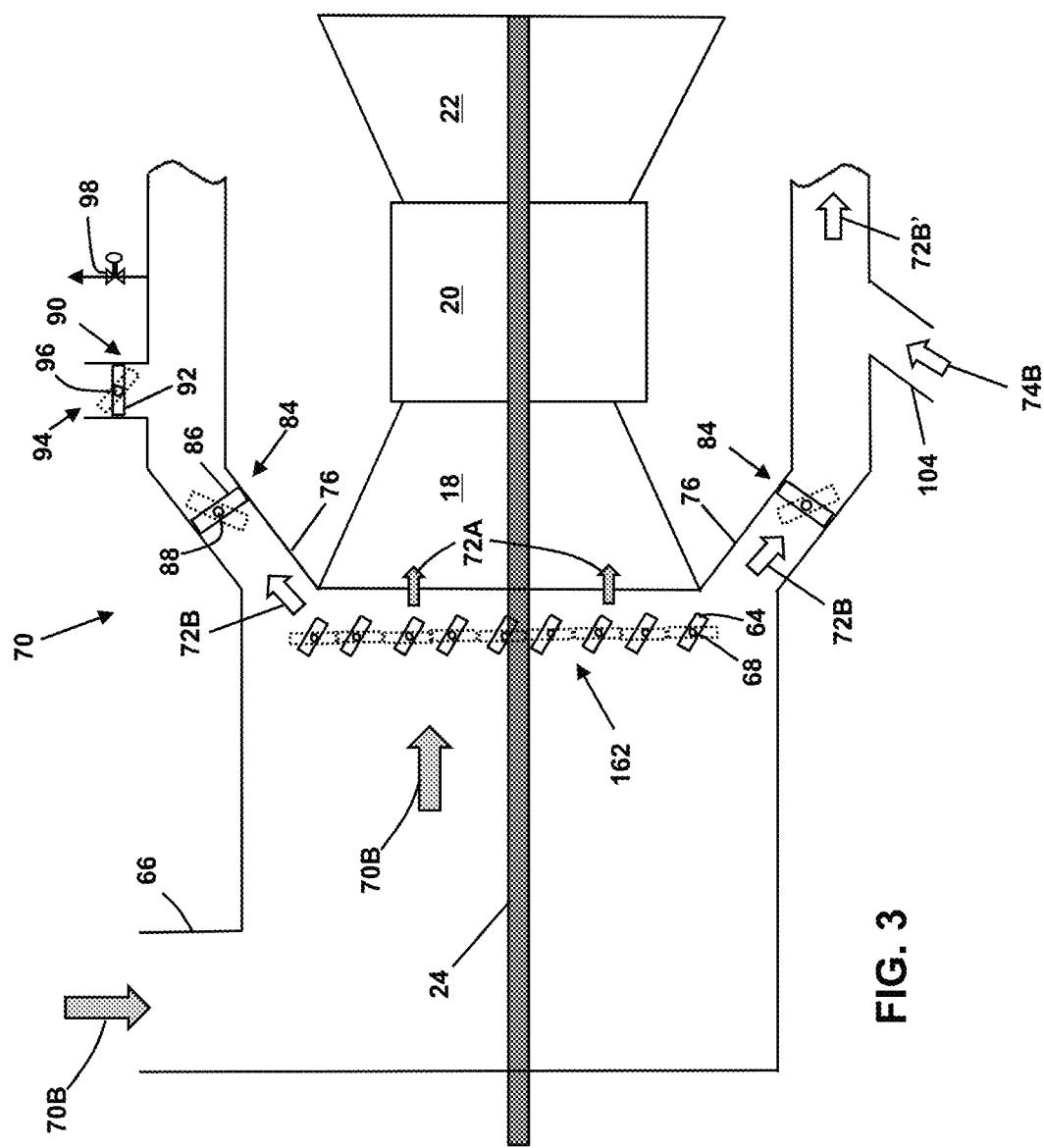
FIG. 3 depicts an enlarged view of a portion of the gas turbine power generation system of FIG. 1 according to embodiments.

As shown in FIG. 3, a guide vane assembly 162 (or other suitable air dividing/diversion system) may be employed to divide the flow of air 70B provided via the duct 66 into a flow of air 72A and a flow of air 72B, based on the positioning of the plurality of inlet guide vanes 64 of the guide vane assembly 162. The flow of air 72A may be directed into the compressor component 18, increasing air pressure and supercharging the compressor component 18 at certain ambient conditions. That is, if the flow of air 72A is greater than the flow rate capacity of the compressor component 18 of the gas turbine system 12, a supercharging of the gas turbine system 12 may occur, increasing the efficiency and power output of the gas turbine system 12.

The flow of air 72B ("bypass air") flows into one or more bypass ducts 76. The bypass air 72B does not enter the compressor component 18 of the gas turbine system 12, but is instead directed to the mixing area 33 (FIG. 1) through the bypass ducts 76.

The bypass air 72B is routed toward the mixing area 33 downstream of the turbine component 22 through one or more bypass ducts 76. The bypass air 72B exits the bypass ducts 76 and enters the mixing area 33 through a bypass air injection grid 78 (FIG. 1), where the bypass air 72B (e.g., ambient air) mixes with and conditions (e.g., cools) the exhaust gas stream 32 to a temperature suitable for use with the SCR catalyst 38. In embodiments, the temperature of the exhaust gas stream 32 generated by the gas turbine system 12 is cooled by the bypass air 72B from about 1100° F. to less than about 900° F. in the mixing area 33. The bypass air injection grid 78 (FIG. 1) may comprise, for example, a plurality of nozzles 80 or the like for directing (e.g., injecting) the bypass air 72B into the mixing area 33. The nozzles 80 of the bypass air injection grid 78 may be distributed about the mixing area 33 in such a way as to maximize mixing of the bypass air 72B and the exhaust gas stream 32 in the mixing area 33. The nozzles 80 of the bypass air injection grid 78 may be fixed in position and/or may be movable to selectively adjust the injection direction of bypass air 72B into the mixing area 33.

A supplemental mixing system 82 (FIG. 1) may be positioned within the mixing area 33 to enhance the mixing process. The supplemental mixing system 82 may comprise, for example, a static mixer, baffles, and/or the like. The CO catalyst 36 may also help to improve the mixing process by adding back pressure (e.g., directed back toward the turbine component 22).

As depicted in FIG. 3, the amount of bypass air 72B flowing into each bypass duct 76 may be further selectively controlled using a flow restriction system 84 comprising, for example, a damper 86, guide vane, or other device capable of selectively restricting airflow. Each damper 86 may be selectively controlled (e.g., rotated) by an independent actuator 88. The actuators 88 may comprise electro-mechanical motors, or any other type of suitable actuator. The dampers 86 may be independently and/or collectively controlled in response to commands from the airflow controller 100 to selectively vary the positioning of the dampers 86 such that a desired amount of bypass air 72B is directed into the mixing area 33 via the bypass ducts 76. Position information (e.g., as sensed by electro-mechanical sensors or the like) for each of the dampers 86 may be provided to the airflow controller 100.

Bypass air 72B may be selectively released from one or more of the bypass ducts 76 using an air release system 90 comprising, for example, one or more dampers 92 (or other devices capable of selectively restricting airflow, e.g. guide vanes) located in one or more air outlets 94. The position of a damper 92 within an air outlet 94 may be selectively controlled (e.g., rotated) by an independent actuator 96. The actuator 96 may comprise an electro-mechanical motor, or any other type of suitable actuator. Each damper 92 may be controlled in response to commands from the airflow controller 100 to selectively vary the positioning of the damper 92 such that a desired amount of bypass air 72B may be released from a bypass duct 76. Position information (e.g., as sensed by electro-mechanical sensors or the like) for each damper 92 may be provided to the airflow controller 100. Further airflow control may be provided by releasing bypass air 72B from one or more of the bypass ducts 76 through one or more metering valves 98 controlled via commands from the airflow controller 100.

Figure 4:
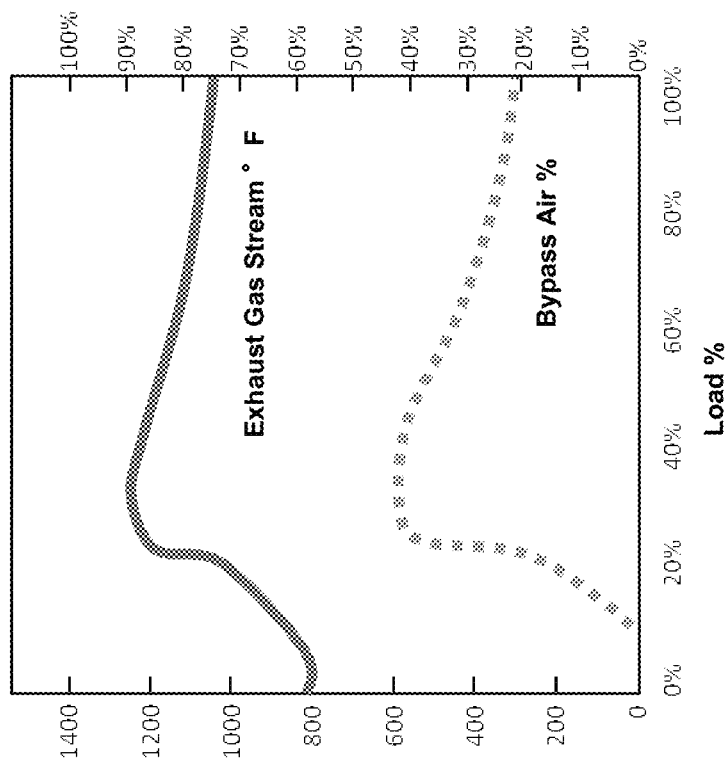
FIG. 4 is a chart showing an illustrative relationship between the flow of bypass air into a mixing area and the temperature of the exhaust gas stream at different load percentages of a gas turbine system, according to embodiments.

The airflow controller 100 (FIG. 1) may be used to regulate the division of the flow of air 70B into the flow of air 72A that enters the compressor component 18 of the gas turbine system 12 (and exits as the exhaust gas stream 32), and the flow of bypass air 72B diverted into the mixing area 33 through the bypass ducts 76, in order to maintain a suitable temperature at the SCR catalyst 38 under varying operating conditions. A chart showing an illustrative relationship between the flow of bypass air 72B into the mixing area 33 and the temperature of the exhaust gas stream 32 at different load percentages of the gas turbine system 12 is provided in FIG. 4. In this example, the chart in FIG. 4 depicts: 1) temperature variation of an exhaust gas stream 32 of a gas turbine system 12 at different load percentages of the gas turbine system 12; and 2) corresponding variation in the flow of bypass air as a percentage of the exhaust gas stream 32 (bypass ratio) needed to maintain the temperature at the SCR catalyst 38 at a suitable level (e.g., 900° F.) at different load percentages of the gas turbine system 12. As represented in the chart in FIG. 4, the amount of bypass air 72B flowing through the bypass ducts 76 into the mixing area 33 may be varied (e.g., under control of the airflow controller 100) as the temperature of the exhaust gas stream 32 changes, in order to regulate the temperature at the SCR catalyst 38.

Referring again to FIG. 2, together with FIG. 1, it can be seen that the flow of air 70A is directed by/through the fan 58B to another guide vane assembly 262, which includes inlet guide vanes 64 and associated independent actuators 68, as detailed above. The guide vane assembly 262 is used to divide the flow of air 70A into a flow of air 74A and a flow of air 74B, based for example, on the positioning of the plurality of inlet guide vanes 64 of the guide vane assembly 262. The flow of air 74B, which has a second pressure level, is directed by the guide vane assembly 262 into a duct 104.

The flow of air 74A, which has a third pressure level, is directed by the guide vane assembly 262 toward the fan 58C.

The flow of air 74B flows through the duct 104 into a bypass duct 76. The flow of air 74B combines with and increases the flow of bypass air 72B passing through the bypass duct 76. The increased flow of bypass air 72B' (FIG. 3) is routed toward the mixing area 33 downstream of the turbine component 22 through the bypass duct 76. The bypass air 72B' exits the bypass ducts 76 and enters the mixing area 33 through the bypass air injection grid 78 (FIG. 1), where the bypass air 72B' (e.g., ambient air) mixes with and conditions (e.g., cools) the exhaust gas stream 32 to a temperature suitable for use with the SCR catalyst 38.

The flow of air 74A is directed by/through the fan 58C to a duct 106. The flow of air 74A passes through the duct 106, which routs the flow of air 74A to a discharge chamber 108 of the compressor component 18, enhancing the performance of the gas turbine 12.

The airflow controller 100 (FIG. 1) may receive data 102 associated with the operation of the gas turbine power generation system 10. Such data may include, for example, the ambient temperature, the temperature of the exhaust gas stream 32 as it enters the mixing area 33, the temperature of the exhaust gas stream 32 at the SCR catalyst 38 after mixing/cooling has occurred in the mixing area 33, the temperature of the flow of air 26 drawn into the air intake section 16 by the combined action of the airflow generation system 56 and the compressor component 18 of the gas turbine system 12, other temperature data obtained at various locations within/around the gas turbine power generation system 10, data measuring the efficiency and performance of the gas turbine power generation system 10, gas turbine system 12, and components thereof, and/or the like. The data 102 may further include airflow and pressure data obtained, for example, within the air intake section 16, at one or more of the guide vane assemblies 62, 162, 262, at one or more of the fans 58A, 58B, 58C, at the entrance of the compressor component 18, within the bypass ducts 76, within the ducts 104, 106, at the downstream end 30 of the turbine component 22, and at various other locations within the gas turbine power generation system 10. Load data, fuel consumption data, and other information associated with the operation of the gas turbine system 12 may also be provided to the airflow controller 100. The airflow controller 100 may further receive positional information associated with the guide vane assemblies 62, 162, 262, dampers 86 and 92, valve 98, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 is configured to independently vary the rotational velocity of each of the fans 58A, 58B, 58C of the airflow generation system 56. According to embodiments, this may be achieved by selectively controlling the degree of coupling of the fans 58A, 58B, 58C to the shaft 24 by the respective couplers 60A, 60B, 60C. The airflow controller 100 is also configured to control, based on the received data 102, the flow of air passing through each of the guide vane assemblies 62, 162, 262, through the flow restriction system 84, and through the metering valves 98. In this way, the flow of air passing into the mixing area 33 downstream of the turbine component 22 through the ducts 66, 104, as well as the flow of air passing into the discharge chamber 108 of the compressor component 18 through the duct 106, may be selectively and precisely controlled (e.g., based on ambient conditions).

The flow of bypass air 72B' flowing through the bypass ducts 76 into the mixing area 33 may be selectively controlled to maintain the temperature at the SCR catalyst 38 at a suitable level. This may be achieved, for example, by varying at least one of: the flow of air 26 drawn into the air intake section 16 by the combined action of the airflow generation system 56 and the compressor component 18 of the gas turbine system 12 (this flow may be controlled, for example, by adjusting one or more of the guide vane assemblies 62, 162, 262, increasing the rotational velocity of the shaft 24, and/or varying the coupling of one or more of the fans 58A, 58B, 58C to the shaft 24); the flow bypass air 72B passing into the bypass ducts 76 (this flow may be controlled, for example, by adjusting the guide vane assembly 162 and/or position of one or more of the dampers 82); and the flow of air 74B passing into the bypass duct 76 via the duct 104 and combining with the flow of bypass air 72B (this flow may be controlled, for example, by adjusting the guide vane assembly 262).

The airflow controller 100 may include a computer system having at least one processor that executes program code configured to control the amount of bypass air flowing through the bypass ducts 76 into the mixing area 33 using, for example, data 102 and/or instructions from human operators. The commands generated by the airflow controller 100 may be used to control the operation of various components (e.g., such as couplers 60A, 60B, 60C, actuators 68, 88, 96, valve 98, and/or other controllable components) in the gas turbine power generation system 10.

The use of an airflow generation system 56 including fans 58A, 58B, 58C in lieu of conventional large external blower systems and/or other conventional cooling structures provides many advantages. For example, the need for redundant external blower systems and associated components (e.g., blowers, motors and associated air intake structures, filters, ducts, etc.) is eliminated. This reduces manufacturing and operating costs, as well as the overall footprint, of the gas turbine power generation system 10. The footprint is further reduced as the airflow generation system 56 draws in air through an existing air intake section 16, rather than through separate, dedicated intake structures often used with external blower systems.

Use of the airflow generation system 56 also provides a more reliable and efficient gas turbine power generation system 10. For example, since the bypass air used for cooling in the mixing area 33 is driven by the shaft 24 of the gas turbine system 12 itself, large external blower systems are no longer required. Further, at least a portion of the flow of air generated by the airflow generation system 56 may be used to supercharge the gas turbine system 12.

Power requirements of the gas turbine power generation system 10 are reduced because the airflow generation system 56 is coupled to, and driven by, the shaft 24 of the gas turbine system 12. This configuration eliminates the need for large blower motors commonly used in conventional external blower cooling systems.

Figure 5:
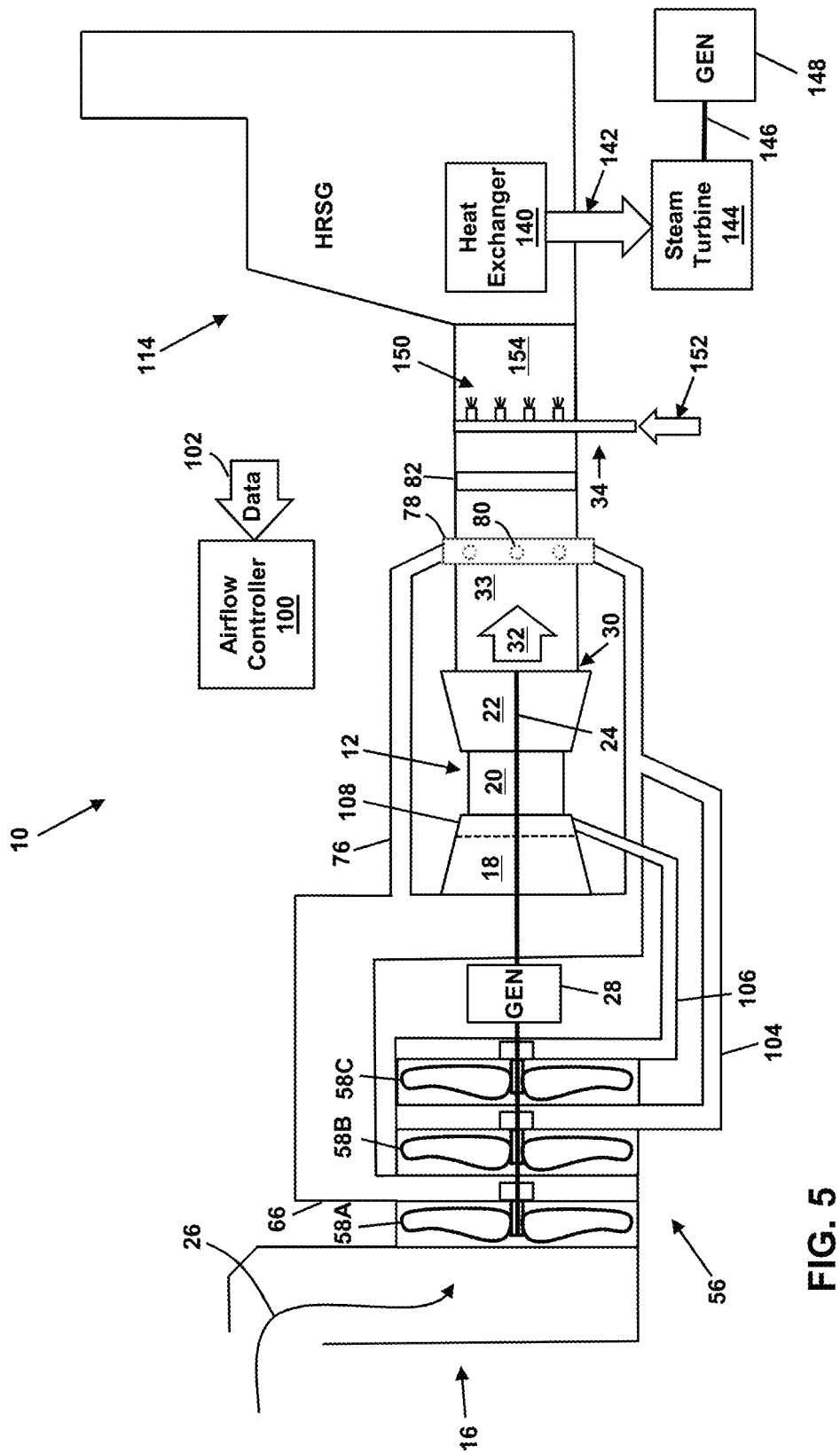
FIG. 5 shows a schematic diagram of a combined cycle turbine power generation system according to embodiments.

A depicted in FIG. 5, the combustion gases that flow through the turbine component 22 exit the downstream end 30 of the turbine component 22 as a stream of exhaust gas 32. In embodiments, the exhaust gas stream 32 flows in a downstream direction 34 into a mixing area 33 and toward/into a heat recovery steam generator (HRSG) system 114.

The HRSG system 114 generally comprises a heat exchanger 140 that recovers heat from the exhaust gas stream 32 of the gas turbine system 12 to produce steam 142. The steam 142 may be used to drive one or more steam turbine systems 144. Each steam turbine system 144 may be coupled via a shaft 146 to one or more electrical generators 148 for producing electricity. The combination of the gas turbine system 12 and the steam turbine system 144 generally produces electricity more efficiently than either the gas turbine system 12 or steam turbine system 144 alone. The steam 142 generated by the HRSG system 114 may also be used in other processes, such as district heating or other process heating. In embodiments, the HRSG system 114 may further include a duct burner system 150 that is configured to burn fuel 152 (e.g., natural gas) in a combustion chamber 154 in order to increase the quantity and/or temperature of the steam 142 generated in the HRSG system 114.

The airflow controller 100 may be used to regulate the amount of air generated by the airflow generation system 56 that is diverted as bypass air through the bypass ducts 76 and into the mixing area 33. Air may be regulated, for example, to control the temperature of the exhaust gas stream 32 at the HRSG system 114. That is, the amount of bypass air flowing through the bypass ducts 76 into the mixing area 33 may be varied (e.g., under control of the airflow controller 100) as the temperature of the exhaust gas stream 32 changes, in order to regulate the temperature at the HRSG system 114.

The bypass air mixed back into the exhaust gas stream 32 of the gas turbine system 12 increases the flow into the HRSG system 114 and reduces the temperature of the flow. This allows increased firing in the duct burner system 150 without reaching the tube temperature limit of the HRSG system 114 (e.g., around 1600° F.). This also allows increased power output from the bottoming cycle of the CC power generation system 10. In embodiments, the power output of the CC power generation system 10 can be increased, for example, by 10 to 15% compared to the power output of a conventional CC power generation system (i.e., no fan).

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for a gas turbine system, comprising:
    an airflow generation system including a plurality of air moving systems for selective attachment to a rotatable shaft of the gas turbine system, the airflow generation system drawing in an excess flow of air through an air intake section; and
    a mixing area for receiving an exhaust gas stream of the gas turbine system, the airflow generation system configured to:
        directing a first portion of the excess flow of air generated by the airflow generation system into the mixing area to reduce a temperature of the exhaust gas stream;
        directing a second portion of the excess flow of air generated by the airflow generation system into the mixing area to reduce the temperature of the exhaust gas stream; and
        directing a third portion of the excess flow of air generated by the airflow generation system into a discharge chamber of a compressor component of the gas turbine system;
    wherein the excess flow of air is configured to bypass the compressor component of the gas turbine system;
    wherein the plurality of air moving systems of the airflow generation system comprise a first fan, a second fan, and a third fan arranged in series, wherein each of the first fan, the second fan, and the third fan is selectively and independently coupled by a coupler to the rotatable shaft of the gas turbine system, and wherein:
        the first fan directs the first portion of the excess flow of air generated by the airflow generation system into the mixing area to reduce the temperature of the exhaust gas stream;
        the second fan directs the second portion of the excess flow of air generated by the airflow generation system into the mixing area to reduce the temperature of the exhaust gas stream; and
        the third fan directs the third portion of the excess flow of air generated by the airflow generation system into the discharge chamber of the compressor component of the gas turbine system.

2. The airflow control system of claim 1, further comprising at least one inlet guide vane for controlling a flow of air through the plurality of air moving systems.

3. The airflow control system of claim 1, further comprising a bypass duct for diverting the first portion of the excess flow of air around the gas turbine system into the mixing area.

4. The airflow control system of claim 3, wherein the bypass duct diverts the second portion of the excess flow of air around the gas turbine system into the mixing area.

5. The airflow control system of claim 1, wherein the excess flow of air drawn in by the airflow generation system comprises 10 percent to 40 percent of a flow of air drawn in by the compressor component of the gas turbine system.

6. The airflow control system of claim 1, wherein the first portion of the excess flow of air, the second portion of the excess flow of air, and the third portion of the excess flow of air have different pressure levels.

7. The airflow control system of claim 1, wherein the airflow generation system is configured to direct a further portion of the excess flow of air into the compressor component of the gas turbine system to supercharge the gas turbine system.

8. The airflow control system of claim 1, further including an airflow controller for controlling the airflow generation system such that the first portion of the excess flow of air and the second portion of the excess flow of air maintain the temperature of the exhaust gas stream at a temperature of less than 900° F. in the mixing area.

9. A turbomachine system, comprising:
a gas turbine system including a compressor component, a combustor component, and a turbine component;
a shaft driven by the gas turbine system;
an airflow generation system for drawing in an excess flow of air through an air intake section, the airflow generation system including a first fan, a second fan, and a third fan arranged in series, wherein each of the first fan, the second fan, and the third fan is selectively and independently coupled by a coupler to the shaft of the gas turbine system; and
a mixing area for receiving an exhaust gas stream of the gas turbine system;
wherein:
the first fan directs a first portion of the excess flow of air generated by the airflow generation system into the mixing area to reduce a temperature of the exhaust gas stream;
the second fan directs a second portion of the excess flow of air generated by the airflow generation system into the mixing area to reduce the temperature of the exhaust gas stream; and
the third fan directs a third portion of the excess flow of air generated by the airflow generation system into a discharge chamber of the compressor component of the gas turbine system;
wherein the excess flow of air is configured to bypass the compressor component of the gas turbine system; and
a system, selected from the group consisting of a selective catalytic reduction (SCR) system and a heat recovery steam generator, for processing the reduced temperature exhaust gas stream.

10. The turbomachine system of claim 9, further comprising at least one inlet guide vane for controlling a flow of air through the airflow generation system.

11. The turbomachine system of claim 9, further comprising a bypass duct for diverting the first portion of the excess flow of air and the second portion of the excess flow of air around the gas turbine system into the mixing area.

12. The turbomachine system of claim 9, wherein the excess flow of air drawn in by the airflow generation system comprises 10 percent to 40 percent of a flow of air drawn in by the compressor component of the gas turbine system.

13. The turbomachine system of claim 9, wherein the first portion of the excess flow of air, the second portion of the excess flow of air, and the third portion of the excess flow of air have different pressure levels.

14. The turbomachine system of claim 9, wherein the airflow generation system is configured to direct a further portion of the excess flow of air into the compressor component of the gas turbine system to supercharge the gas turbine system.

15. The turbomachine system of claim 9, further including an airflow controller for controlling the airflow generation system such that the first portion of the excess flow of air and the second portion of the excess flow of air maintain the temperature of the exhaust gas stream at a temperature of less than 900° F. in the mixing area.

16. A power generation system, comprising:
a gas turbine system including a compressor component, a combustor component, and a turbine component;
a shaft driven by the gas turbine system;
an electrical generator coupled to the shaft for generating electricity;
an airflow generation system for drawing in excess flow of air through an air intake section, the airflow generation system including a first fan, a second fan, and a third fan arranged in series, wherein each of the first fan, the second fan, and the third fan is selectively and independently coupled by a coupler to the shaft of the gas turbine system; and
a mixing area for receiving an exhaust gas stream of the gas turbine system;
wherein:
the first fan directs a first portion of the excess flow of air generated by the airflow generation system into at least one of: the mixing area to reduce a temperature of the exhaust gas stream; and an inlet of the compressor component to supercharge the gas turbine system;
the second fan directs a second portion of the excess flow of air generated by the airflow generation system into the mixing area to reduce the temperature of the exhaust gas stream; and
the third fan directs a third portion of the excess flow of air generated by the airflow generation system into a discharge chamber of the compressor component of the gas turbine system;
wherein the excess flow of air is configured to bypass the compressor component of the gas turbine system; and
a system, selected from the group consisting of a selective catalytic reduction (SCR) system and a heat recovery steam generator, for processing the reduced temperature exhaust gas stream.

* * * * *